(12) United States Patent
Walsh et al.

(10) Patent No.: US 9,118,770 B2
(45) Date of Patent: Aug. 25, 2015

(54) REMOTE HEADSET CONFIGURATION

(75) Inventors: Scott Walsh, Foxham (GB); Keith Derrick, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 3220 days.

(21) Appl. No.: 11/217,967

(22) Filed: Aug. 31, 2005

(65) Prior Publication Data
US 2007/0049198 A1   Mar. 1, 2007

(51) Int. Cl.
| H04B 5/00 | (2006.01) |
| H04M 3/42 | (2006.01) |
| H04M 1/60 | (2006.01) |
| H04M 1/725 | (2006.01) |
| H04W 28/18 | (2009.01) |
| H04W 76/02 | (2009.01) |
| H04W 88/02 | (2009.01) |

(52) U.S. Cl.
CPC ........ H04M 1/6066 (2013.01); H04M 1/72525 (2013.01); H04W 28/18 (2013.01); H04W 76/02 (2013.01); H04W 88/02 (2013.01)

(58) Field of Classification Search
USPC ........... 455/41.1, 41.2, 66.1, 375.2, 569, 426, 455/78, 3.01, 414, 445, 554.2; 370/352, 370/401, 328, 312, 329, 386, 429
See application file for complete search history.

(56) References Cited

U.S. PATENT DOCUMENTS

| 5,729,603 | A  | * | 3/1998  | Huddart et al. ......... 379/395.01 |
| 5,913,163 | A  |   | 6/1999  | Johansson et al. |
| 5,983,100 | A  |   | 11/1999 | Johansson et al. |
| 6,065,041 | A  | * | 5/2000  | Lum et al. ..................... 709/203 |
| 6,237,022 | B1 | * | 5/2001  | Bruck et al. .................. 709/201 |
| 6,370,141 | B1 | * | 4/2002  | Giordano et al. ............ 370/386 |
| 6,430,395 | B2 | * | 8/2002  | Arazi et al. .................. 455/41.2 |
| 6,538,668 | B1 | * | 3/2003  | Ruberg et al. ................ 715/747 |
| 6,606,506 | B1 | * | 8/2003  | Jones ......................... 455/556.1 |
| 6,662,163 | B1 | * | 12/2003 | Albayrak et al. ............. 704/275 |
| 6,718,034 | B1 | * | 4/2004  | Larsen ..................... 379/390.01 |
| 7,292,880 | B2 | * | 11/2007 | Lehtonen ................... 455/569.1 |
| 7,349,689 | B2 | * | 3/2008  | Chandley .................... 455/420 |
| 2001/0049262 | A1 |   | 12/2001 | Lehtonen |
| 2003/0162544 | A1 | * | 8/2003  | Austin et al. ................. 455/445 |
| 2004/0098453 | A1 | * | 5/2004  | Stern ........................... 709/203 |
| 2004/0209569 | A1 | * | 10/2004 | Heinonen et al. ............ 455/41.2 |
| 2006/0084384 | A1 | * | 4/2006  | Kiemunki .................... 455/41.3 |

FOREIGN PATENT DOCUMENTS

| EP | 1161064 A    | 12/2001 |
| WO | WO0137524 A  | 5/2001  |

* cited by examiner

*Primary Examiner* — Ganiyu A Hanidu
(74) *Attorney, Agent, or Firm* — Chuang Intellectual Property Law (57) ABSTRACT

Systems and methods for modifying mobile communication device settings are disclosed. The method generally includes providing a server at the headset, transmitting headset settings from the server to a client device, receiving modified settings, and implementing the modified settings.

26 Claims, 8 Drawing Sheets

REMOTE HEADSET CONFIGURATION

BACKGROUND OF THE INVENTION

Recently, the functionality of mobile communication devices such as headsets has increased. For example, wireless headsets offer users increased operational flexibility. As the available functions of such devices increases, the man-machine interface becomes more complex, particularly where it is advantageous to allow a user to modify settings associated with the headset functions.

However, headsets typically have a minimal user interface, often restricted to a few LEDs and user interface buttons. The limited user interface available on a headset may be due to space constraints or ease of use. The result is that the user's ability to easily modify settings on the headset is restricted. Furthermore, due to the limited user interface, manufacturers may choose to make certain features or settings fixed, i.e., not modifiable by the user.

As a result, there is a need for improved methods and apparatuses which allow a user to modify mobile communication device settings.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for remote configuration of wireless mobile communication devices are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Generally, this description describes a method and apparatus for remote configuration of a wireless mobile communication device such as a headset. For example, the usability of a headset can be enhanced by providing a method and apparatus for the user to modify settings associated with features or functions such as a user friendly name, passkey, and user interface button functionality. The present invention is applicable to a variety of different types of mobile communication devices in addition to headsets, including cell phones and personal digital assistants (PDAs). While the present invention is not necessarily limited to such devices, various aspects of the invention may be appreciated through a discussion of various examples using this context.

According to an example embodiment of the present invention, a wireless headset includes a server for providing web pages to a client device. The web pages displayed on the client present the user with current values for user modifiable settings and allow the user to change the settings as desired. One advantage of this arrangement is that the human-machine interface required to interact with the headset has now been made available at a client device. The client device provides for a display, thereby enabling a user to view and modify headset settings with increased ease.

Figure 1:
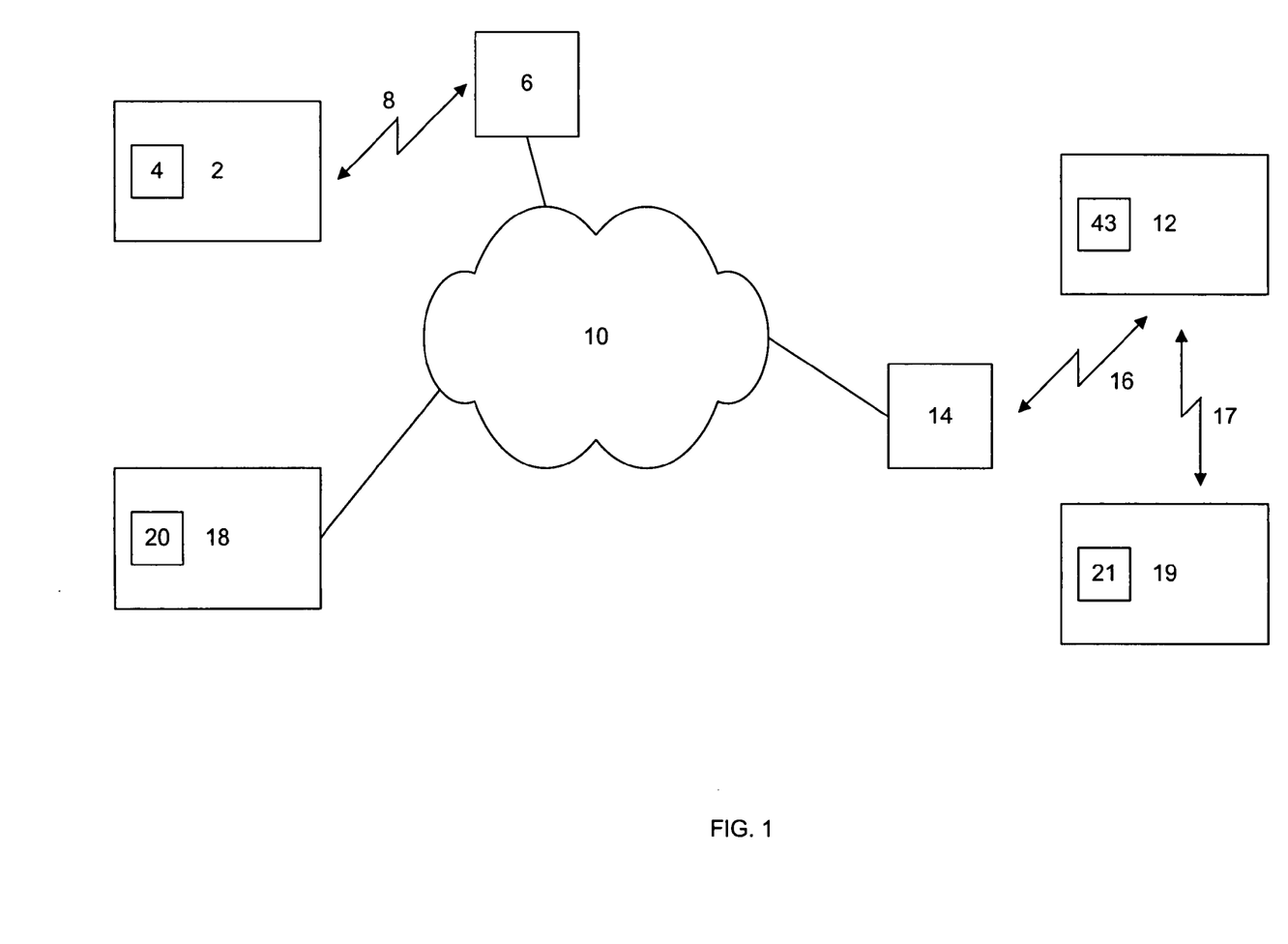
FIG. 1 illustrates an embodiment of a network on which the present invention may operate.

FIG. 1 illustrates an embodiment of a network on which the present invention may operate. A client 2 accesses a headset 12 in order to modify user settings on the headset 12. Client 2 is a computing device such as a personal computer and may operate on a variety of hardware and software platforms. For example, client 2 may also be a Bluetooth enabled mobile handset, laptop computer, portable digital music player, personal digital assistant, or combination thereof. Client 2 includes a software application for receiving content and interacting with headset 12. In one example, client 2 includes a web browser 4 for receiving web pages from headset 12. Headset 12 is described in further detail in reference to FIG. 2 and FIG. 3 below.

Client 2 is capable of wireless connection to the Internet. In an embodiment of the invention, the client 2 connects to the Internet 10 via a WAP gateway 6. A variety of wireless communication network air interfaces may be utilized to communicate with the WAP gateway 6. In a further example system configuration, a client 19 with a browser 21 connects directly to headset 12 via a Bluetooth wireless link 17. Client 19 hardware and software is similar to that of client 2. In another example, a client 18 with a web browser 20 comparable to client 2 is connected to the Internet 10 via a wired line. Although reference to only client 2 may be made herein for convenience, it should be understood that such description also applies to client 19 and client 18.

Headset 12 is capable of bi-directional wireless connection to the Internet via a WAP gateway 14. A variety of wireless communication network air interfaces may be utilized to establish a wireless communication link 16 with the WAP gateway 14. The headset 12 includes a settings server application 43 with user settings management functionality as described in further detail below. The number of clients and headsets shown in FIG. 1 are merely for example only, and the present invention may utilize any number of such devices.

For example, client 2, 18, and 19 and headset 12 are TCP/IP enabled devices and therefore addressable as network devices. Protocols for exchanging data via TCP/IP networks are well known and need not be discussed herein. The TCP/IP network could be the Internet or a private intranet. However, the present invention is not restricted to TCP/IP networks.

Figure 5A:
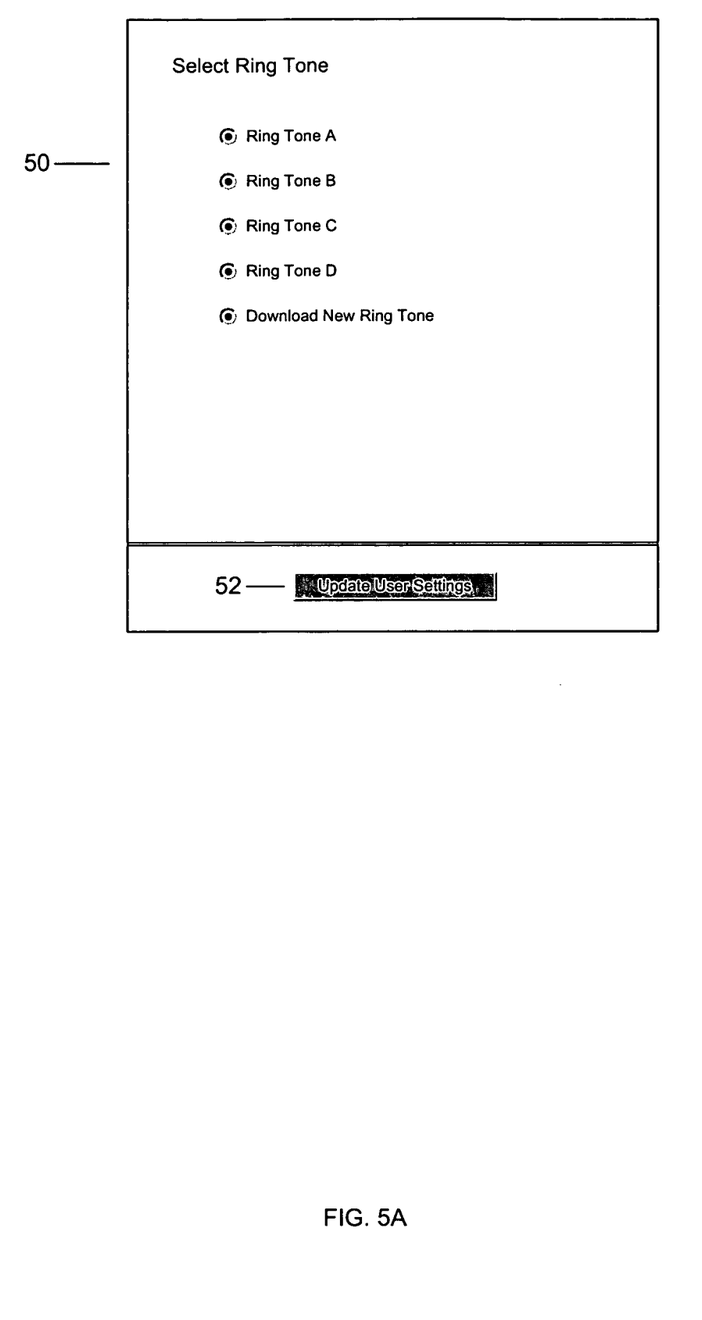
FIGS. 5A and 5B illustrate sample browser pages allowing a user to modify headset user settings.
Figure 5B:
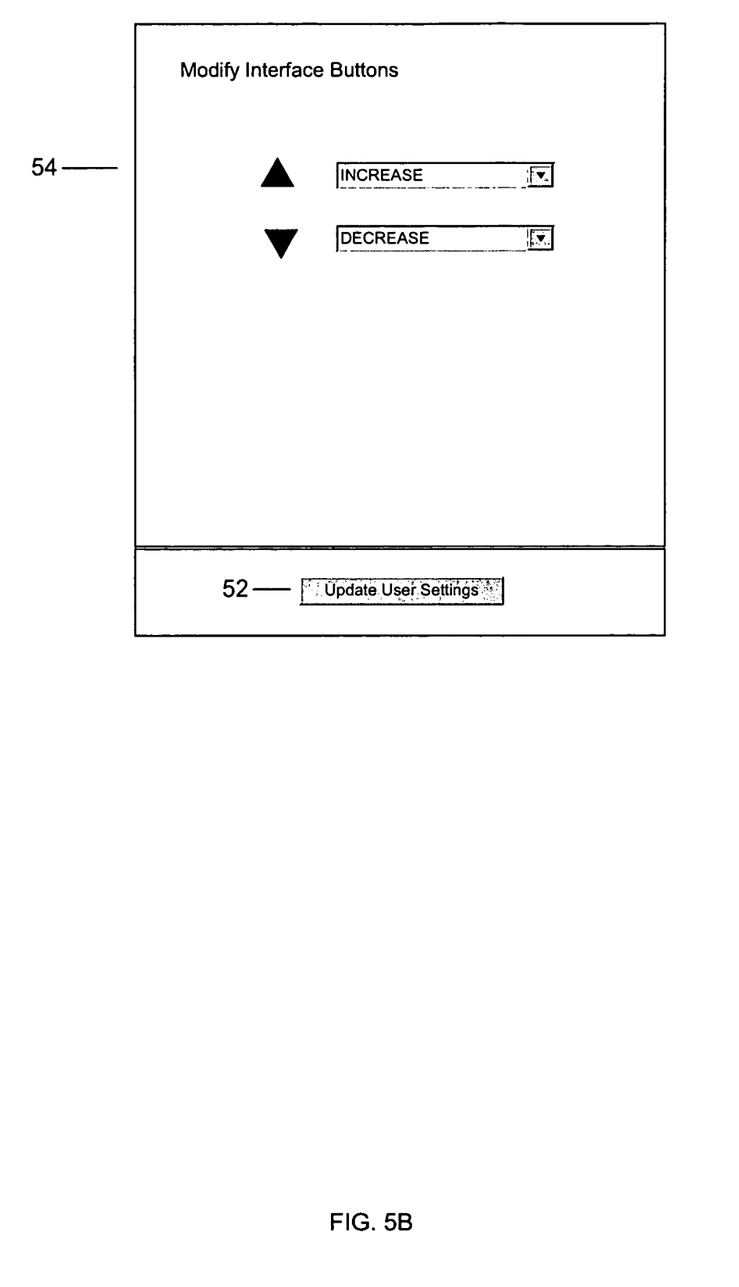

In accordance with one aspect of the invention, a client web browser is used to modify a user's desired settings for headset 12. The settings are then received and implemented at headset 12. Such settings may include, for example, user interface button functions. Referring to FIG. 5A and FIG. 5B, sample web pages 50 and 54 are illustrated which may be used to receive user settings. A wishing to access a settings server application 43 residing in a headset 12 utilizes a client 2. Upon a request generated by a user at a client 2, web pages are transferred to the client 2 through the Internet 10 using HTTP and TCP/IP protocols and displayed with the held of a standard web browser such as Internet Explorer, Mozilla, or other browser.

Figure 2:
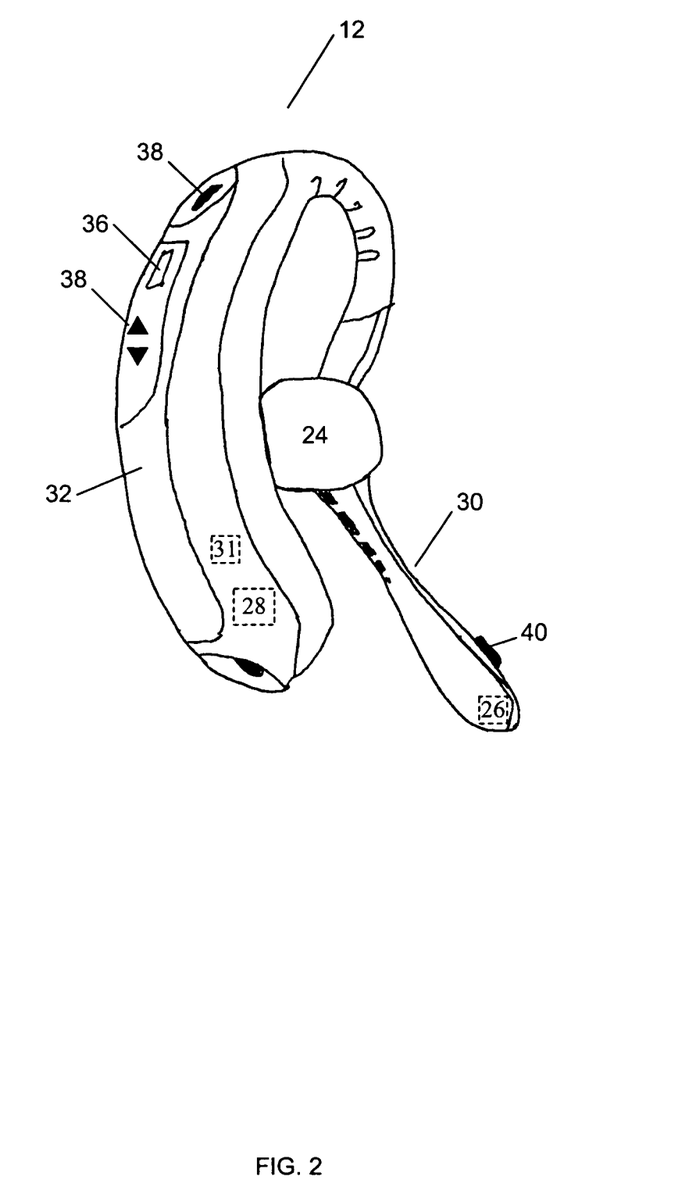
FIG. 2 illustrates a perspective view of one example of a headset server of the invention.

Referring to FIG. 2, a perspective view of a mobile communication device 2 in the form of an over-the-ear headset 12 is illustrated. The headset 12 includes a speaker 24, a microphone 26, a user interface 38, status indicator 36, and a wireless communication module 31 installed within a housing of the headset 12. The term "module" is used interchangeably with "circuitry" herein. The user interface 38 may include a multifunction power, volume, mute, and select button or buttons. Other user interfaces may be included on the headset, such as a link active/end interface 40. The button depressions are detected by a headset controller, which then initiates modifications corresponding to the particular button that was pressed. It will be appreciated that numerous other configurations exist for the user interface. The particular button or buttons and their locations are not critical to the present invention.

The headset 12 includes a boom 30 with the microphone 26 installed at the lower end of the boom. The main housing of the headset may be in the shape of a loop 32 to be worn behind a user's ear. The headset 12 further includes a power source such as a rechargeable battery 28 installed within the housing.

In one example, wireless communication module 31 communicates over an RF network employing the Bluetooth standard with a corresponding Bluetooth module at the client device. The Bluetooth specification includes a profile for implementing TCP/IP over the Bluetooth link. Bluetooth is a radio-frequency protocol which allows electronic devices to connect to one another over short-range radio links. Bluetooth devices operate in the ISM (industrial, scientific, medical) band at about 2.4 to 2.5 GHz, and have a range limited to about 10 meters. Spread spectrum frequency hopping limits interference from other devices using the ISM bandwidth. The limited user interface on Bluetooth headsets makes it difficult, if not impossible, to perform user customization tasks associated with operation of the headset. Certain achievable features of a headset may be left off due to the lack of a practical user interface. The Bluetooth specification, version 2.0, is hereby incorporated by reference.

A prescribed interface such as Host Control Interface (HCI) is defined between each Bluetooth module. Message packets associated with the HCI are communicated between the Bluetooth modules. Control commands, result information of the control commands, user data information, and other information are also communicated between Bluetooth modules.

The user interface 38 is used to modify operational settings of the headset for purposes including directly accessing configuration settings, turning the power off and on, adjusting the volume of sound emitted by the headset etc. The function of some of the user interface buttons may be dependent upon the particular operational state of the headset.

Figure 3:
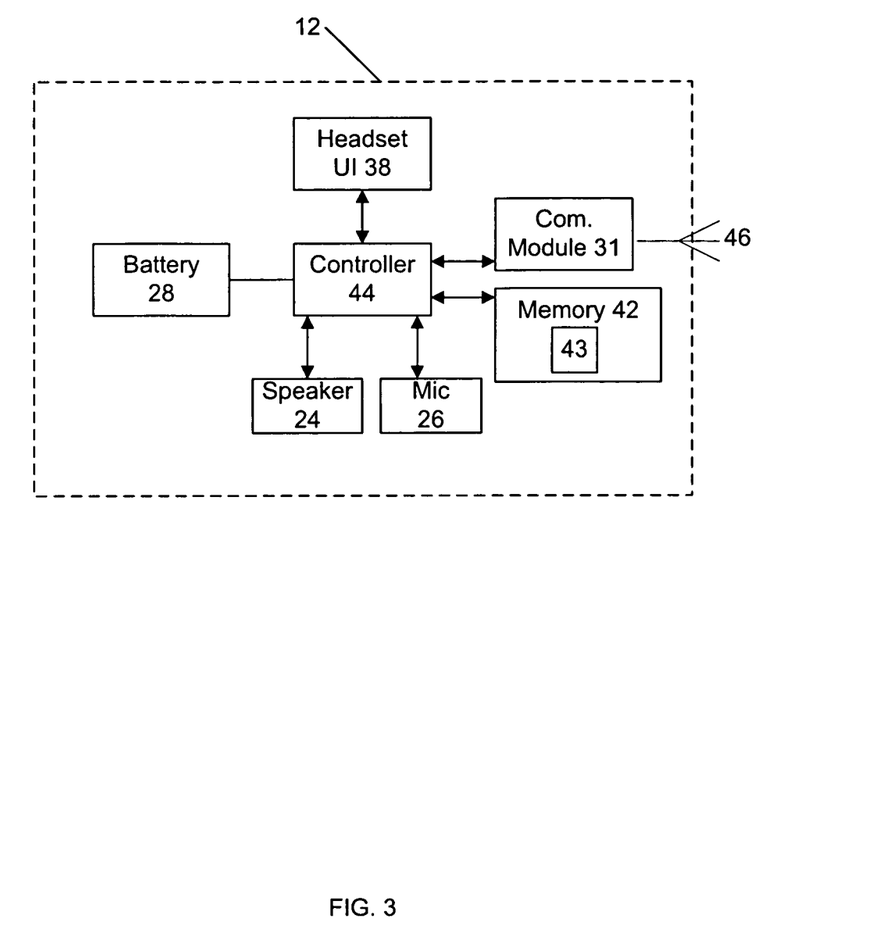
FIG. 3 illustrates a simplified block diagram of the components of the headset server shown in FIG. 2.

FIG. 3 illustrates a simplified block diagram of the components of the headset 12 shown in FIG. 2. Headset 12 includes a headset controller 44 such as a microprocessor and a memory 42 executing software such as settings server application 43 to implement functionality as described herein. Although illustrated separately, memory 42 may integrated with controller 44. Headset controller 44 further includes an analog-to-digital (A/D) converter and a digital-to-analog (D/A) converter. The headset controller 44 receives input from headset user interface 38 via an input decoder and manages audio data received from microphone 26 and sent to speaker 24. The headset controller 44 further interacts with wireless communication module 31 to transmit and receive signals between the headset 12 and a client device (not shown) employing comparable communication modules or a WAP gateway. Wireless communication module 31 includes an antenna 46. Battery 28 provides power to the various components of the headset. In a further example, the wireless communication module 31 may include a controller which controls one or more operations of the headset 12.

Figure 4:
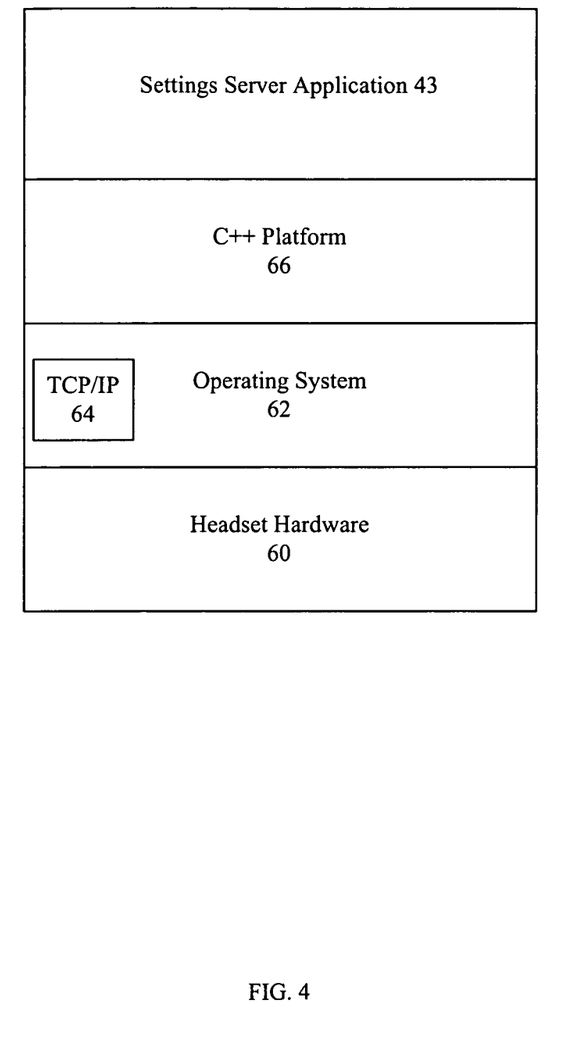
FIG. 4 illustrates an example architecture of the software residing on a headset.

Referring to FIG. 4, the architecture of the software residing on headset 12 in an example of the invention is illustrated. At the lowest level of the diagram shown in FIG. 4 is headset hardware 60 on which the software of the present invention is executed. Hardware 60 executes an operating system 62 which provides the basic functionality of the headset platform. Operating system 62 is in an embodiment of the invention, but other operating systems may be used in further embodiments. A hardware abstraction layer (not shown) comprises software drivers to control the various devices in headset 12. Operating system 62 supports Transport Control Protocol/Internet Protocol (TCP/IP) 64. Each headset is therefore addressable as a network device.

Headset hardware 60 executes C++ platform 66 in one example of the invention. Settings server application 43 is a C++ application that manages and controls the resources of headset 12 to receive and process requests associated with headset settings from client devices. In an example of the invention, settings server application 43 transmits web pages to a browser on a client device which allow the client device user to view and modify current values for user modifiable settings.

A user interfaces with a client 2 through a software application to indicate a request to view or change the headset user settings. The request is converted into a data packet using the TCP/IP protocol and is transmitted, over the Internet 10, to the headset 12. Once a session has been opened, a user may issue commands to view or change settings. The client transmits a coded message to the headset 12 representing values for settings. This coded message is interpreted by the settings server application 43 and modifications are implemented.

Referring again to FIG. 3, the controller 44 is connected to the user interface 38. The controller 44 monitors the activity of the headset 12 and detects the occurrence of an action by a user via user interface 38 and responsively changes the desired setting. Controller 44 also receives user input via client 2.

Memory 42 is used to store settings server application 43 and other programs which control the headset 12. The programs stored in the memory 42 are executed by the controller 44. Methods that are carried out by programs stored in the memory 44 are described below with reference to FIGS. 6A and 6B. The memory 42 is a form of computer readable media. Other forms of computer readable media can alternatively be used to store programs that are executed by controller 44. Memory 42 also stores data for use by controller 44, including program data and the current settings of headset 12.

The wireless communication module 31 can be in the form of a digital wireless transceiver for bi-directional communication. For example, the wireless communication module 31 can be a transceiver used in known wireless networking devices that operate under the standard of Bluetooth. The wireless communication module 31 may also, for example, operate under the 802.11a, 802.11b, or related standard. The antenna 46 can be either an antenna integral with the wireless communication module 31 or an antenna external to the wireless communication module 31. Wireless communication module 31 may include both voice, data, or voice and data communications. Wireless communication module 31 may be configured with a variety of protocols, including a Bluetooth hands-free protocol. Other protocols include, for example, service discovery application, file transfer protocol, and general access profile.

The microphone 26 receives the user's speech, and the analog signals formed thereby are converted to a digital signal using an analog-to-digital (A/D) converter. The A/D converter may be integrated with the controller 44. In the reverse direction, a voice signal received from a far-end user is converted from a digital signal to an analog signal using a digital-to-analog (D/A) converter and transferred to speaker 24 for output to the near end user. The controller and wireless communication module, or portions thereof may be integrated in a chip set.

The graphical user interface employed by the web browser at client device may employ a variety of layouts to receive user modifications. For example, various menu selection options may be employed. FIGS. 5A and 5B illustrate exemplary browser pages showing how a user might change headset settings. Referring to FIG. 5A, a browser page 50 is shown allowing a user to modify the headset ring tone or download a new ring tone by making an appropriate selection using a radio button. For example, the ring tones may be .WAV, MIDI, or MP3 file formats. Once the user selection is made, an "Update User Settings" button 52 enables the user to transmit the new settings to the headset server. Referring to FIG. 5B, a browser page 54 is shown allowing a user to modify the function of a headset user interface button to either be an increase function or a decrease function. Similarly, other headset settings may be modified using additional browser pages.

Figure 6A:
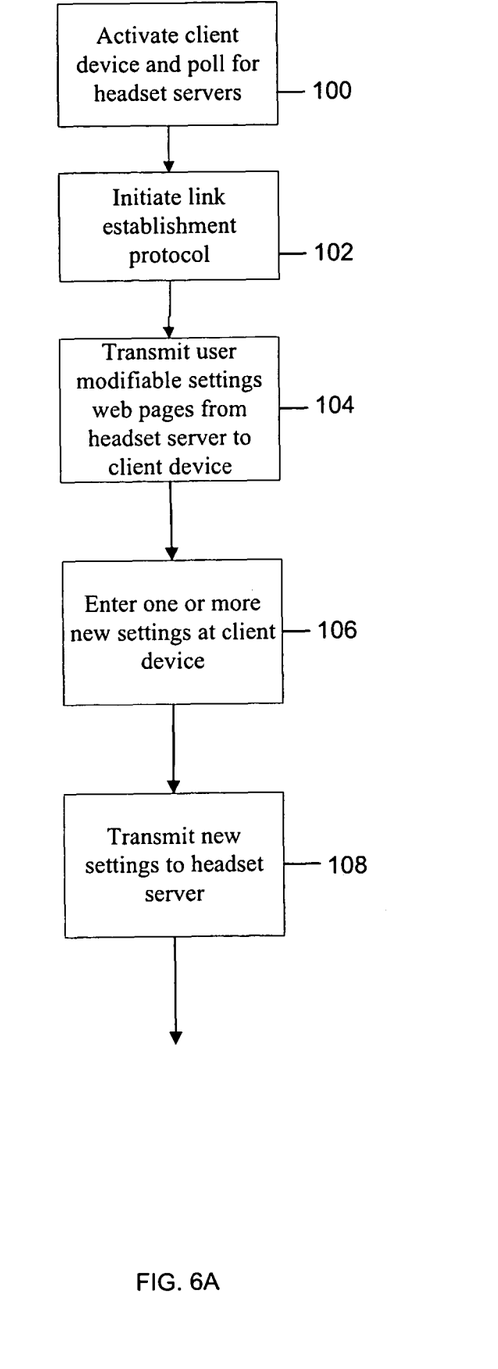
FIGS. 6A and 6B are a flow chart illustrating operation of a headset in one example of the invention.
Figure 6B:
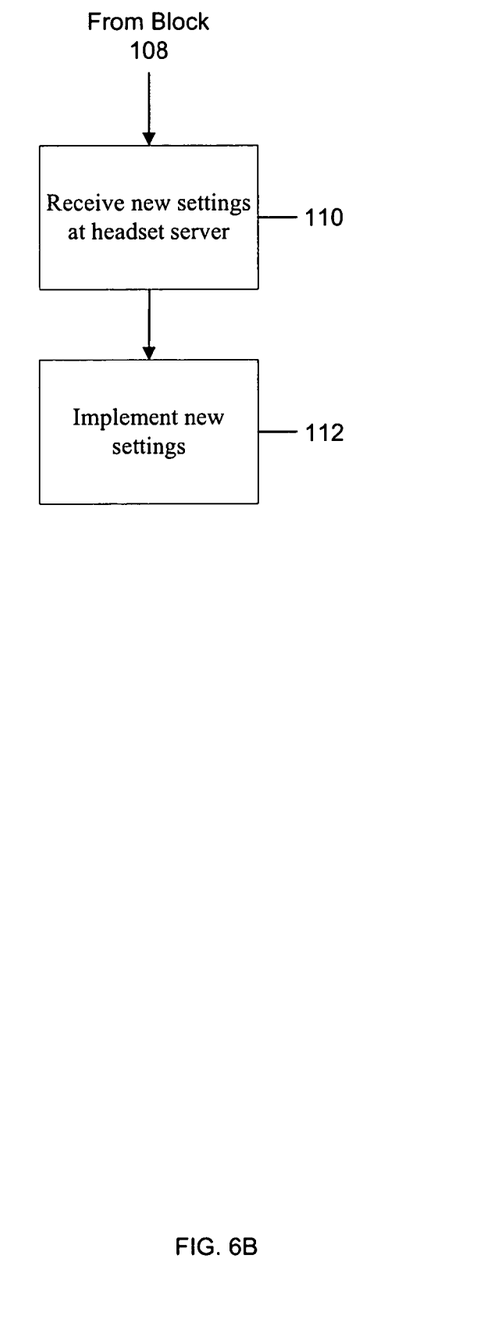

FIGS. 6A and 6B are a flow chart illustrating operation of a headset in an example of the invention. At block 100, client devices are activated and poll for possible headsets. Activation and polling are performed in a manner similar to the Bluetooth Device Discovery Procedure as described in the Bluetooth Specification. At step 102, a link establishment protocol is initiated between the client device and headset server.

Using the established link, relevant information regarding the settings and operation of the headset can be visually conveyed to the user at a client device. At block 104, the headset server transmits user modifiable settings web pages to the client device. In particular, user interface menus can be displayed on a web browser, allowing a headset user to change headset settings using visual menus rather than a conventional headset user interface. At step 106, the user enters one or more new settings using the client device. At step 108, new settings entered by the user are transmitted to the headset server.

At step 110, new settings transmitted by the client device are received by the headset server. At step 112, the modified user settings of the headset server are implemented. The headset can thereby act upon the requested new user settings similarly to the way a conventional headset would act upon depression of a user interface button located on the headset.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the number and types of modifiable headset settings; types of client devices; display format of the headset settings on the client device; number, placement, and functions performed by the user interface buttons and display; types of mobile communication devices; wireless communication technologies, standards, and procedures to perform the link between the headset and client. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for modifying headset settings comprising:
providing a server at a headset;
establishing a link between the headset and a client device;
transmitting headset settings from the server to the client device for display;
receiving modified headset settings at the server from the client device; and
implementing the modified headset settings at the headset.

2. The method of claim 1, wherein establishing a link between the server and a client device comprises initiating a TCP/IP connection.

3. The method of claim 2, wherein the link utilizes the Bluetooth standard.

4. The method of claim 1, wherein the link between the headset and the client device is a wireless link.

5. The method of claim 1, further comprising transmitting voice communications between the headset and the client device.

6. The method of claim 1, wherein the client device comprises a mobile phone, personal computer, or personal digital assistant.

7. The method of claim 1, wherein the modified headset settings comprise ring tones.

8. The method of claim 1, wherein the modified headset settings comprise headset user interface configurations.

9. The method of claim 1 wherein transmitting headset settings from the server to the client device comprises sending web pages displaying current headset settings.

10. A non-transitory computer readable storage medium storing instructions that when executed by a computer cause the computer to perform a method for modifying headset settings, comprising:
providing a server at a headset;
establishing a link between the headset and a client device;
transmitting headset settings from the server to the client device for display;
receiving modified headset settings at the server from the client device; and
implementing the modified headset settings at the headset.

11. The non-transitory computer readable storage medium of claim 10, wherein establishing a link between the server and a client device comprises initiating a TCP/IP connection.

12. The non-transitory computer readable storage medium of claim 10, wherein the link utilizes the Bluetooth standard.

13. The non-transitory computer readable storage medium of claim 10, wherein the link between the headset and the client device is a wireless link.

14. The non-transitory computer readable storage medium of claim 10, wherein the method further comprises transmitting voice communications between the headset and the client device.

15. The non-transitory computer readable storage medium of claim 10, wherein the client device comprises a mobile phone, personal computer, or personal digital assistant.

16. The non-transitory computer readable storage medium of claim 10, wherein the modified headset settings comprise ring tones.

17. The non-transitory computer readable storage medium of claim 10, wherein the modified headset settings comprise headset user interface configurations.

18. The non-transitory computer readable storage medium of claim 10 wherein transmitting headset settings from the server to the client device comprises sending web pages displaying current headset settings.

19. A headset comprising:
   a server means for receiving requests from a client device;
   a linking means for connecting the server means to the client device;
   a communication mechanism for transmitting headset settings from the server to the client device and receiving modified headset settings from the client device; and
   a settings management mechanism for implementing the modified headset settings.

20. The apparatus of claim 19, wherein the communication mechanism for transmitting headset settings sends web pages displaying current headset settings.

21. The apparatus of claim 19, wherein the modified headset settings comprise user interface configurations.

22. The apparatus of claim 19, further comprising a voice communication mechanism for transmitting voice communications between the headset and the client device.

23. A wireless headset comprising:
   a speaker;
   a microphone;
   a controller;
   a wireless communication interface for connecting to a client device; and
   an application program residing in a headset memory for transmitting current headset settings to the client device for display and for receiving modified user settings from the client.

24. The wireless headset of claim 23, wherein the wireless communication interface utilizes the Bluetooth standard.

25. The wireless headset of claim 23, wherein connecting to a client device comprises a TCP/IP connection.

26. The wireless headset of claim 23, wherein transmitting current headset settings to the client device comprises sending web pages for display on a web browser.

* * * * *